April 28, 1970     J. L. BOGGS     3,509,563

CODE SELECTING DEVICE USING CONCENTRIC TUBES

Filed May 8, 1967     3 Sheets-Sheet 1

INVENTOR
JAMES L. BOGGS

BY *Louis A. Kline*
*Albert L. Sealey, Jr.*
*Elmer Wargo*

HIS ATTORNEYS

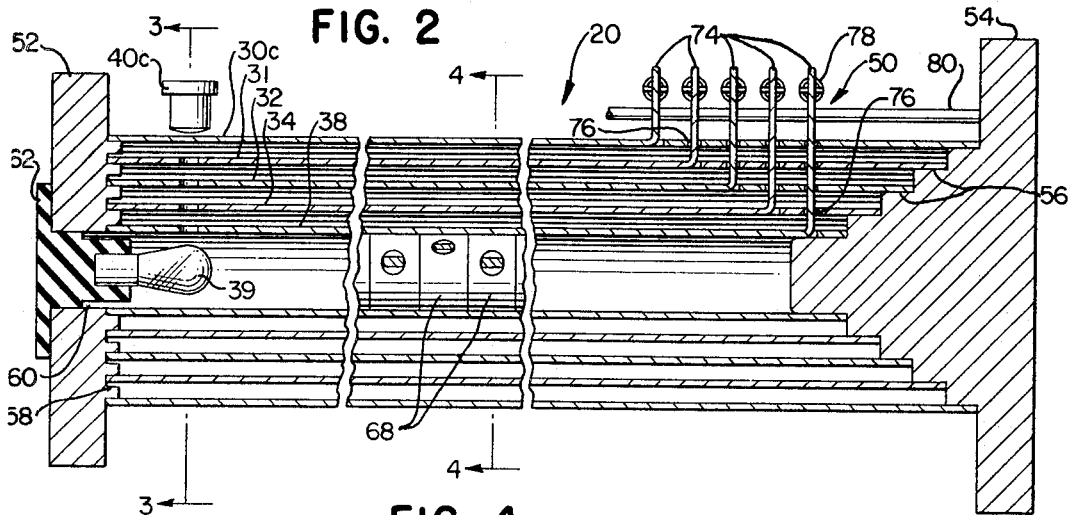
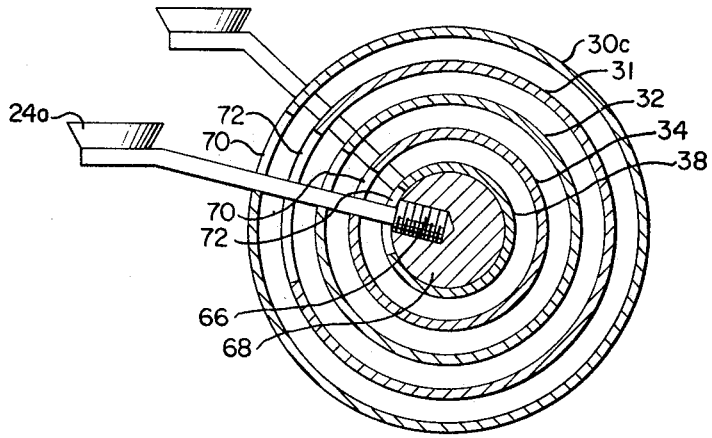
FIG. 5
| KEY | TUBE ROTATED | OUTPUT | | | | |
|---|---|---|---|---|---|---|
| | | 8 | 4 | 2 | 1 | CLOCK |
| 0 | CLOCK | 0 | 0 | 0 | 0 | 1 |
| 1 | CLOCK-1 | 0 | 0 | 0 | 1 | 1 |
| 2 | CLOCK-2 | 0 | 0 | 1 | 0 | 1 |
| 3 | CLOCK-1-2 | 0 | 0 | 1 | 1 | 1 |
| 4 | CLOCK-4 | 0 | 1 | 0 | 0 | 1 |
| 5 | CLOCK-4-1 | 0 | 1 | 0 | 1 | 1 |
| 6 | CLOCK-4-2 | 0 | 1 | 1 | 0 | 1 |
| 7 | CLOCK-4-2-1 | 0 | 1 | 1 | 1 | 1 |
| 8 | CLOCK-8 | 1 | 0 | 0 | 0 | 1 |
| 9 | CLOCK-8-1 | 1 | 0 | 0 | 1 | 1 |
| A CONTROL | 8-2 | 1 | 0 | 1 | 0 | 0 |
| B CONTROL | 8-2-1 | 1 | 0 | 1 | 1 | 0 |
| C CONTROL | 8-4 | 1 | 1 | 0 | 0 | 0 |
| D CONTROL | 8-4-1 | 1 | 1 | 0 | 1 | 0 |
| E CONTROL | 8-4-2 | 1 | 1 | 1 | 0 | 0 |
| F CONTROL | 8-4-2-1 | 1 | 1 | 1 | 1 | 0 |
INVENTOR
JAMES L. BOGGS
BY *Louis A. Kline*
*Albert L. Sessler*
*Elmer Wargo*
HIS ATTORNEYS April 28, 1970     J. L. BOGGS     3,509,563
CODE SELECTING DEVICE USING CONCENTRIC TUBES
Filed May 8, 1967     3 Sheets-Sheet 3
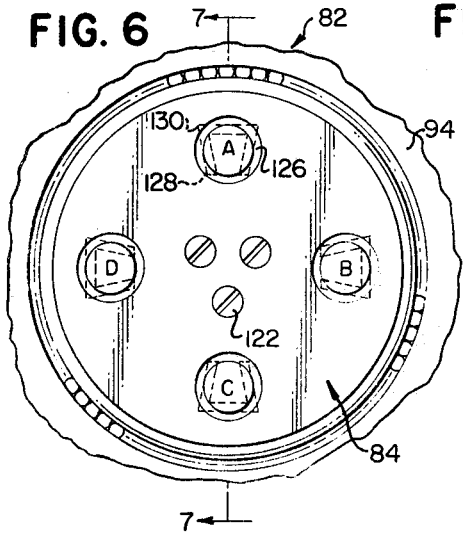
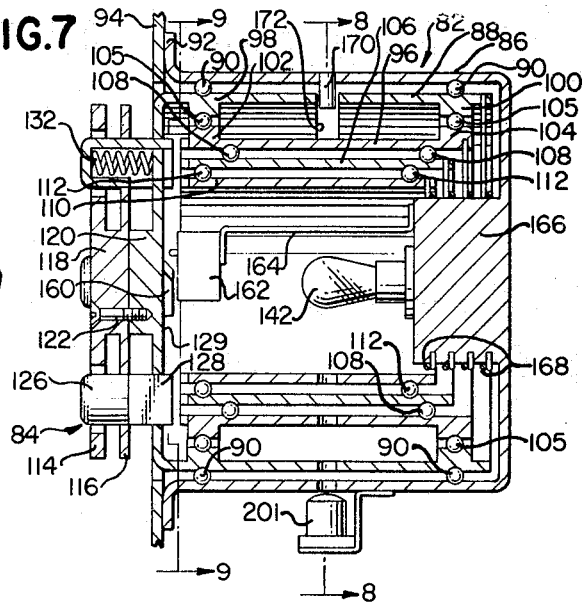
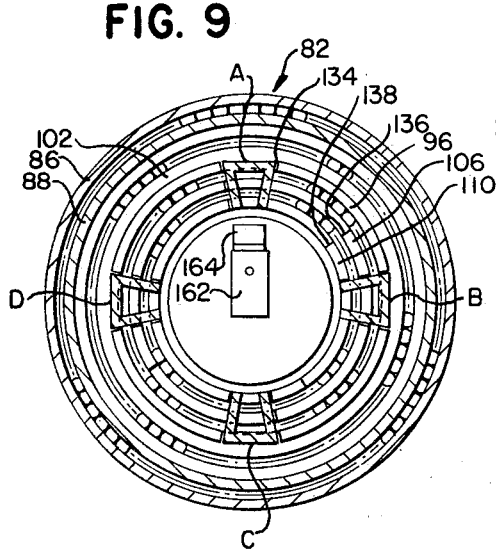
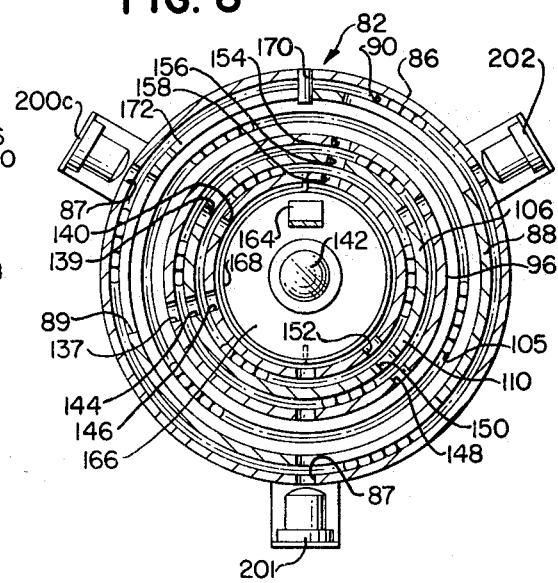
FIG. 10
| KEY | TUBE ROTATED | OUTPUT | | |
|-----|--------------|---|---|-------|
| | | 2 | 1 | CLOCK |
| A | CLOCK | 0 | 0 | 1 |
| B | CLOCK-1 | 0 | 1 | 1 |
| C | CLOCK-2 | 1 | 0 | 1 |
| D | CLOCK-1-2 | 1 | 1 | 1 |
INVENTOR
JAMES L. BOGGS
HIS ATTORNEYS United States Patent Office 3,509,563
Patented Apr. 28, 1970

3,509,563
CODE SELECTING DEVICE USING CONCENTRIC TUBES
James L. Boggs, Covington, Ohio, assignor to The National Cash Register Company, Dayton, Ohio, a corporation of Maryland
Filed May 8, 1967, Ser. No. 636,875
Int. Cl. H03k 13/18
U.S. Cl. 340—347               9 Claims

ABSTRACT OF THE DISCLOSURE

A device for converting information from one form to another using a plurality of concentric tubes and light responsive means. The tubes are aligned to energize selected ones of the light-responsive means according to a predetermined code by actuator means which include manually operated keys and dial means.

Background of the invention

This invention relates to a device for converting information from one form to another, and, in the embodiments selected to illustrate the device, electro-optical means are used for converting characters from one form to a binary code.

A prior-art electro-optical translator is shown in United States Patent No. 2,921,204, which issued Jan. 12, 1960, on the application of Donald F. Hastings et al. and which discloses a complex converter for converting analog information to digital form using a binary code. As stated in that patent, one of the problems encountered in such devices is the difficulty in maintaining the light source, the code pattern, and the photocells in accurate alignment with one another. In contrast, applicant's device is simpler to construct and has few alignment problems.

Summary of the invention

Applicant's device utilizes a plurality of tubes which are rotatably mounted in concentric relationship with one another, a source of energy mounted within the innermost one of said tubes, and a plurality of sensing members positioned around the periphery of the outermost one of said tubes to respond to said energy. The tubes have a plurality of areas thereon (arranged according to a predetermined code) to permit the energy from said source to reach selected ones of said sensing members when said areas are aligned in a particular way. Actuator means are provided to rotate selected ones of said tubes away from a home position to a read position so as to align selected ones of said areas enabling said energy to pass through said aligned areas and energize selected ones of said energy responsive members according to said predetermined code. When the actuator means are released, the moved tubes are returned to the home position by a restoring means. In the embodiment of the invention shown herein, light is used as the energy medium.

Accordingly, a primary object of this invention is to produce a dependable, low-cost, compact, device for converting information from one form to another.

Another object is to provide a device of the above variety which is especially adaptable for converting information to a binary code.

These and other objects and advantages will become more readily understood in connection with the following description and drawings.

Brief description of the drawings

FIG. 2 is a side elevational view, partly in cross-section, and taken along the line 2—2 of FIG. 1, showing the mounting of the concentric tubes;

FIG. 4 is a view similar to FIG. 3 but is taken along the line 4—4 of FIG. 2, showing how the operating keys of the actuating means are mounted relative to the concentric tubes;

FIG. 5 is a chart showing the relation between input and output information for the embodiment shown in FIGS. 1 through 4;

FIG. 6 is a front view in elevation showing a second embodiment of the invention, in which the actuator means rotating the concentric tubes includes a dialing means;

FIG. 7 is a side elevational view, partly in cross-section, and taken along the line 7—7 of FIG. 6, showing principally the means for mounting the tubes concentrically with one another;

FIG. 8 is a front view, partly in cross-section, and taken along the line 8—8 of FIG. 7, showing the arrangement of the light-responsive members and light-transmitting areas of the concentric tubes;

FIG. 9 is a view similar to FIG. 8 but is taken along the line 9—9 of FIG. 7, showing details of the dialing means for rotating the concentric tubes; and FIG. 10 is a chart showing the relation between input and output information for the embodiment shown in FIGS. 6 through 9.

Description of the preferred embodiments

Figure 1:
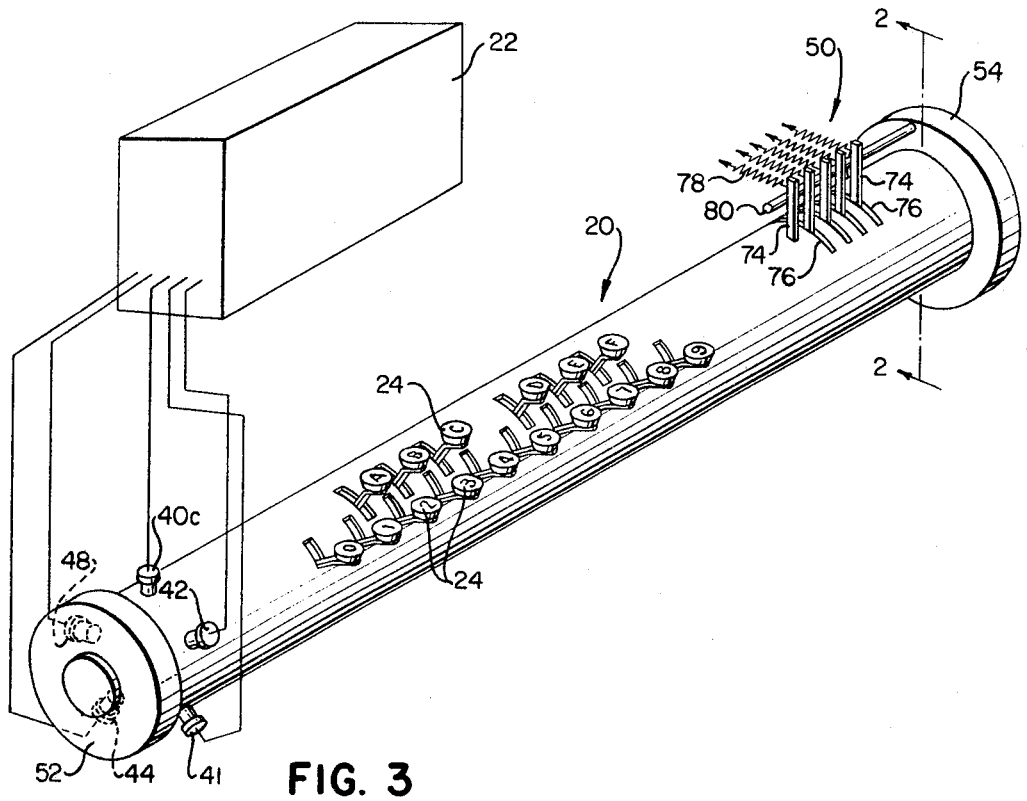
FIG. 1 is a general view in perspective of one embodiment of this invention.

FIG. 1 shows one embodiment of this invention, in which the device 20 for converting information from one form to another is shown in use with a utilization device 22, such as a computer, which uses the coded information.

To use the device 20, the information to be translated or converted is entered upon the keys 24, one character at a time. For example, if the number 28 is to be converted to a binary code, the key 24 marked with the numeral "2" is first depressed, if that is the preferred order of entry. Depression of said key rotates selected ones of the tubes 30C, 31, 32, 34, and 38 (FIG. 3), so that light from the light source 39 passes through aligned light-transmitting areas in the tubes to energize the appropriate light-responsive members 40C, 41, 42, 44, and 48, which represent the clock, 1, 2, 4, and 8 bit positions, respectively. When one of these light-responsive members is energized, an output of "1" is recorded in the utilization device 22 for that member, and, conversely, when no light reaches the pertaining light-responsive member, a "0" is recorded. When the key 24 (marked with a numeral "2") is released, spring means 50 (FIGS. 1 and 2) return said tubes to a home position, enabling the next character to be converted to be entered upon the device. In the example given, the next character to be converted is the number 8, which is entered upon the device 20 by simply depressing the key 24 marked with the numeral "8."

Figure 3:
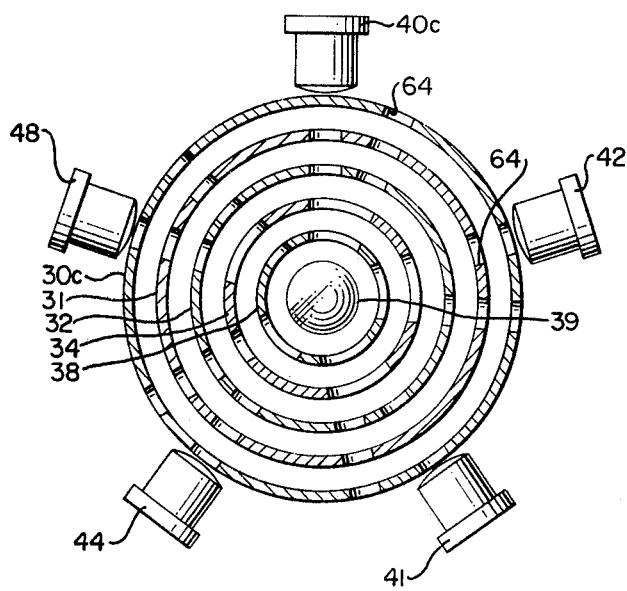
FIG. 3 is an end elevational view, partly in cross-section, and taken along the line 3—3 of FIG. 2 showing light source, the light-sensitive means, and the arrangement of light-transmitting areas in the concentric tubes.

As seen in FIGS. 2, 3, and 4, the tubes 30C, 31, 32, 34, and 38 are mounted in concentric relationship with one another, with the opposed ends of said tubes being rotatably mounted on support members 52 and 54. The support member 54 (FIG. 2) has a plurality of stepped annular rims 56 thereon to rotatably receive one end of said tubes, while the support member 52 has a plurality of annular grooves 58 therein to receive the opposite ends of said tubes. The support member 52 has in its center an aperture 60, in which a flanged, insulating insert 62 is mounted to support the source of light 39, which is energized by conventional means.

The code used for translating the information from one form to another is obtained as follows. Each one of the concentric tubes has therein light-transmitting areas 64 (FIG. 3), which are arranged thereon in a predetermined manner to obtain the output shown in the Chart in FIG. 5. The designations in the column headed KEY and marked 0 through 9 inclusive, and A Control through F Control inclusive, as shown on this chart, refer to the characters correspondingly marked on the keys 24 shown in FIG. 1. The designations under the column headed "Tube Rotated" from the Chart (FIG. 5) correspond to the tubes shown in FIG. 3. For example, the tube designated CLOCK corresponds to the outermost tube, marked 30C, in FIG. 3. Similarly, the tubes marked 1, 2, 4, and 8 from the Chart (FIG. 5) correspond to the tubes marked 31, 32, 34, and 38, respectively, in FIG. 3. The outputs marked CLOCK, 1, 2, 4, and 8 in the Chart (FIG. 5) correspond to the conventional, light-responsive elements 40C, 41, 42, 44, and 48, respectively, as shown in FIG. 3. From said Chart, actuation of the key marked 2, for example, requires rotation of the tubes marked CLOCK and 2 to produce an output of "1" in the light-responsive elements marked CLOCK and 2. The remaining outputs, marked 1, 4, and 8, produce an "0" output.

The actuator means for rotating the concentric tubes to a read position from the home position shown in FIGS. 1, 3, and 4 operate as follows. Each one of the keys 24 has a threaded end 66 (FIG. 4), which is secured to a cylindrical member 68, which is rotatably mounted within teh innermost tube 38. Each key 24 passes radially outwardly of the concentric tubes through slots such as 70 and 72 (FIG. 4). The sector angles drawn to the extremities of the slots 72 are greater than their counterparts in the slots 70, and, as a result, when the key marked 24a (FIG. 4) is depressed, it pivots counterclockwise (as viewed in FIG. 4) about the axis of the tube 38 and rotates only those tubes which have the smaller sector-angle slots 70. In the arrangement shown in FIG. 4, only the tubes 30C, 32, and 34 are rotated by actuation of the key marked 24a. The particular arrangement of slots 70 and 72 through which the pertaining key 24 is inserted is correlated with the light-transmitting area 64 (FIG. 3) in accordance with the predetermined code shown in the Chart of FIG. 5. Each key 24, when actuated, is rotated through the same angle, so that alignment of said light areas 64 is easily effected to permit energization of the light-responsive members 40C, 41, 42, 44, and 48 in accordance with said code.

After an individual key 24 is actuated to move the pertaining concentric tubes to a read position, the tubes and the key are returned to the home position by the spring means 50 shown in FIGS. 1 and 2. Each tube 30C, 31, 32, 34, and 38 has a projection 74 extending radially outwardly therefrom in such a manner that the projection of each inner one of the concentric tubes passes through a slot or aligned slots in the succeeding outer ones of said tubes, enabling each said tube to be moved independently of one another. For example, the projection 74 joined to the innermost tube 38 (FIG. 2) passes through elongated slots 76 in the tubes 34, 32, 31, and 30C to extend outwardly of the outermost tube 30C. Each projection 74 has its exterior end secured to a spring 78, which pulls it against a bar 80 secured to the support member 54 to axially align the projections 74 and thereby align said tubes in the home position, shown in FIG. 3.

A second embodiment 82 (FIGS. 6, 7, 8, and 9) of this invention utilizes the concentric tubes as already described; however, the actuator means for rotating the tubes includes a dial 84 instead of the keys 24 shown in FIG. 1. To simplify the illustration of the embodiment 82, a code requiring the use of only a few concentric tubes was selected, although this embodiment can be used for codes requiring the use of more concentric tubes.

The concentric tubes of the second embodiment 82 are rotatably mounted in a support means as follows. The support means includes a cylindrical can-type member 86 (FIG. 7), into which a second can-type member 88 is inserted (open end first) and rotatably mounted therein through the use of ball bearings 90, which are retained in complementary annular grooves in said members 86 and 88. The outer can-type member 86 has a flange 92, which is secured to a face plate 94 to facilitate mounting of the device 82.

The outermost one 96 of the concentric tubes (FIG. 7) is rotatably mounted in its support means as follows. The can-type member 88 has two spaced, annular projections 98 and 100 depending from the inside of its circumferential wall, with an annular groove being provided in each said projection. The outermost tube 96 has two spaced, annular projections 102 and 104 extending from the outside of its circumferential wall, with an annular groove also being provided in each said projection. The projections 98 and 102 are located on the member 88 and the tube 96, respectively, in opposed relation, so that their annular grooves complement each other to retain ball bearings 105 therein. The other projections, 100 and 104, are similarly used to retain ball bearings 105, which rotatably support the tube 96 in the can-type member 88.

The middle tube 106 of the concentric tubes (FIG. 7) is rotatably supported within the outermost concentric tube 96 as follows. The tube 96 has, on the inside of its circumferential wall, a pair of spaced, annular grooves which are aligned with a pair of annular grooves on the outside of the circumferential wall of said middle tube 106 to provide complementary grooves in which ball bearings 108 are inserted and retained.

In a similar manner, the inner tube 110 (FIG. 7) is rotatably mounted within the middle tube 106 by having ball bearings 112 retained in a pair of complementary annular grooves located on the inside of the circumferential wall of the tube 106 and the outside of the circumferential wall of the inner tube 110.

The ball bearings, used to mount the tubes 110, 106, and 96 for rotation relative to one another, also perform the function of maintaining said tubes in axial alignment with one another. These ball bearings are positioned between adjacent tubes by known techniques, as by aligning complementary grooves on adjacent tubes, inserting the bearings through an aperture in one of said grooves, and detachably sealing said aperture.

The dial means 84 is operatively connected to the concentric tubes by the construction shown principally in FIGS. 6 and 7. The dial means 84 includes a pair of spaced, parallel discs 114 and 116, which are integrally formed on a common hub 118, which in turn is detachably secured to a boss 120 formed on the outside of the base of the cylindrical can-type member 88 by fasteners 122 (FIG. 6).

The dial means 84 also includes depressible keys marked A, B, C, and D (FIG. 6). Each said key is circular in cross section for approximately the first half of its length, and is generally U-shaped in cross section for the second half, as shown in FIGS. 6 and 7. The first half 126 of each said key is slidably mounted in a mating aperture in the disc 116, while the second half 128 is slidably mounted in a mating aperture in the base 129 of the can-type member 88. At the junction of said first and second halves, shoulders 130 are formed, which restrict the movement of said keys axially (relative to the common axis of the concentric tubes) away from said base 129. Each of said keys A, B, C, and D is urged in this direction by its own compression spring 132 (FIG. 7), which abuts against the outside of the base 129 and the closed end of the respective key.

Each key A, B, C, and D cooperates with the concentric tubes 110, 106, and 96 to effect the actuation or rotation of selected ones of said tubes according to the predetermined code as presented in the chart in FIG. 10. The letters A, B, C, and D in said chart, appearing under the heading KEY, correspond to the keys similarly marked in FIG. 6. The concentric tubes 96, 106, and 110 correspond, respectively, to the tubes marked Clock 1, and 2 as listed on said chart under the heading TUBE ROTATED. As previously indicated in relation to the Chart shown in FIG. 5, an OUTPUT of a "1" in the chart of FIG. 10 corresponds to energization of the pertaining light-responsive element, and an output of "0" corresponds to no energization.

As shown in FIG. 8, three light-responsive elements are used in the second embodiment of the invention. These elements, marked 200C, 201, and 202 (FIG. 8), correspond, respectively, to the items marked CLOCK 1, and 2 as listed under OUTPUT in the chart of FIG. 10. The elements 200C, 201, and 202 are arranged 120 degrees apart around the periphery of the outermost can-type member 86 and are energized in accordance with the predetermined code shown in FIG. 10.

The actuator or dial means 84 for moving selected ones of the concentric tubes (96, 106, and 110) to energize predetermined ones of said light-responsive elements 200C, 201, and 202 operates as follows. For example, according to the chart of FIG. 10, when the dial means 84 is rotated with key A actuated, the tube designated "CLOCK" is rotated, and the output marked "CLOCK" receives a "1" (or a + output), while the outputs under the columns marked 1 and 2 receive a zero (or no output). From FIG. 9, the U-shaped portion of key A fits into a notch 134 in the tube 96 when the key is depressed. Notches 136 and 138 are also present in the tubes 106 and 110, respectively; however, these notches have a greater arcuate length than does the notch 134. As a consequence, when key A is depressed, it slides axially towards the notch 134 to be inserted therein. The dial means 84 may be rotated in a manner similar to that in which a telephone dial is rotated, by the operator's using one finger to depress the desired key and rotate the dial means 84. When said dial means 84 is rotated clockwise (as viewed in FIG. 6) with key A depressed, only the tube 96 (of the tubes 96, 106, and 110) is rotated, enabling the aperture 137 (FIG. 8) therein to become aligned in a radial direction with apertures 139 and 140 in the tubes 106 and 110, respectively, permitting light from a light bulb 142 to pass through the apertures 140, 139, and 137 to energize the light- responsive element 200C.

Because the dial means 84 is mounted on the can-type member 88, the member 88 also rotates when the dial means 84 is rotated. To prevent the member 88 from blocking the light from the bulb 142 when the dial means is in the home position or when it is rotated to the read position, a long slot 89 (FIG. 8) is provided in the member 88 adjacent to each light-responsive element 200C, 201, and 202. A small slot 87 in the can-type member 86 is also provided near each light-responsive element 200C, 201, and 202 to permit light from the bulb 142 to reach said elements. The slots 87 and 89 do not affect the code shown in FIG. 10.

Following the example of the previous paragraph, when the dial means 84 is rotated with the key marked D actuated, the tubes marked 96, 106, and 110 are rotated clockwise from the home position shown in FIG. 8, and the following events occur: the apertures 137, 144, and 146 become aligned with the light-responsive element 200C, enabling light from the bulb 142 to energize the light-responsive element 200C; the apertures 148, 150, and 152 become aligned with the element 201, enabling light from the bulb 142 to energize the element 201; and the apertures 154, 156, and 158 become aligned with the element 202, enabling light from the bulb 142 to energize the element 202 according to the code of FIG. 10. Whenever a tube is to be rotated according to this code, a notch of small arcuate length, such as the notch 134 in the tube 96 (FIG. 9), is present under the pertaining key when the tubes are in the home position, shown. From an inspection of the notches shown in FIG. 9, it is apparent that all three tubes 96, 106, and 110 will be rotated when the key D is depressed and then rotated. If a tube is not to be rotated, a notch of longer arcuate length, such as the notch 136 (FIG. 9) will be present under the pertaining key. From the discussion of the actuation of the keys A and D already given, the output of the light-responsive elements 200C, 201, and 202 (according to the code of FIG. 10) resulting from an actuation of the remaining keys B and C should be apparent.

The following construction is used to provide for energization of the light bulb 142 when the dial means 84 is actuated. The base 129 of the can-type member 88 (FIG. 7) has a camming member 160 thereon, which member engages an operating lever on a switch 162, upon the clockwise rotation of the dial means 84, already mentioned, to energize the light bulb 142 by conventional means. The switch 162 is provided with conventional bias means to return the operating lever of the switch to the "off" position when the dial means 84 is returned to the home position, shown in FIGS. 6, 7, 8, and 9. The switch 162 is secured in place by a bracket 164, which is secured to a central hub or boss 166 (FIG. 7), which in turn is part of the can-type member 86.

The means for returning said concentric tubes and dial means 84 to the home position is shown particularly in FIGS. 7 and 8. Each of the tubes 96, 106, and 110, and also the can-type member 88, is provided with a spring 168, which has one end secured thereto, with the remaining end secured to the boss 166, so as to independently rotate said tubes and can-type member counter-clockwise, as viewed in FIG. 8, to the home position, shown therein. A pin 170 (FIGS. 7 and 8), depending from the can-type member 86, cooperates with a slot 172 in the periphery of the inner can-type member 88 to provide a limit stop for the dial means 84 when it is rotated clockwise, as viewed in FIG. 6, and when it is returned to the home position, shown in FIG. 8.

While this invention has been disclosed using light as the particular energy medium, the device would also work when a different energy medium, such as fluid under pressure, for example, is used. When fluid is used, the concentric tubes would be rotatably mounted in concentric relation with one another; however, the tubes would not be spaced but would be in sealing engagement with one another by conventional techniques. The particular energy-responsive members used when a fluid is used would be conventional gas or fluid pressure indicators.

While the forms of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:
1. A device for converting data from one form to another, comprising:
 frame means;
 a plurality of tubes rotatably mounted in spaced concentric relation with one another on said frame means;
 a light source mounted within the innermost one of said tubes;
 a plurality of light-responsive members fixed relative to said frame means and mounted around the periphery of the outermost one of said tubes;
 each said tube having an array of light-transmitting areas therein corresponding to a predetermined code;
 said tubes having a home position and a read position with reference to said frame means;
 actuator means for rotating selected ones of said tubes away from said home position to said read position so as to align selected ones of said light-transmitting areas, thereby enabling light from said light source to energize selected ones of said light-responsive members according to said predetermined code; and means to return said tubes to said home position from said read position.

2. The device as claimed in claim 1 in which said actuator means includes manually operable keys which are positioned along generally radial lines which are perpendicular to the common axis of said tubes.

3. The device as claimed in claim 1 in which said tubes have a plurality of groups of slots therein; said actuator means comprising:
  a plurality of keys with each said key being positioned in one of said groups of slots and extending through all said tubes and being mounted relative to said frame means so as to be moved between said home and read positions;
  each said group of slots being dimensioned relative to its respective said key so as to enable selected ones of said tubes to be rotated by said last-named key as it is moved from said home position to said read position, thereby enabling said selected ones of said light-responsive members to be energized according to said predetermined code.

4. The device as claimed in claim 3 in which said actuator means includes a cylindrical member for each said key with said cylindrical members being rotatably mounted within the innermost one of said tubes,
  one end of each said key being mounted in its respective cylindrical member along a generally radial line which is perpendicular to the common axis of said tubes.

5. The device as claimed in claim 1 in which said actuator means includes a manually operable dial means which is positioned at one end of said tubes and is operatively connected therewith.

6. The device as claimed in claim 1 in which said actuator means includes:
  dial means positioned at one end of said plurality of tubes and movable between said home and read positions:
  said tubes having notches in one end thereof with said notches being located adjacent to said dial means;
  said dial means being operatively connected with said notches so as to differentially move selected ones of said tubes upon actuation of said dial means to align said tubes, enabling light from said source to pass through said light-transmitting areas to energize selected ones of said light-responsive members.

7. The device as claimed in claim 1 in which said actuator means comprises:
  dial means positioned at one end of said plurality of tubes;
  said dial means having a home position and a read position relative to said frame means, and also having a plurality of depressible keys thereon, said keys being adapted to be moved in an axial direction relative to the common axis of said tubes;
  said tubes having notches in one end thereof, said notches being located adjacent to said dial means,
  said notches having an arcuate length in accordance with said predetermined code;
  each said key being adapted to enter one said notch of each said tube upon actuation of said key and to rotate selected ones of said tubes upon rotation of said last-named key and said dial means to said read position to thereby align selected ones of said light-transmitting areas, thereby enabling light from said light source to energize selected ones of said light-responsive members according to said predetermined code;
  means to return said dial means to said home position from said read position; and
  resilient means to urge said keys out of said notches upon deactuation of said keys.

8. A converter for converting information from one form to another, comprising:
  a light source;
  a plurality of light cells adapted to be energized by light from said source;
  a plurality of opaque tubes in spaced concentric relation with one another and being positioned between said light source and light cells, said tubes having light-transmitting areas therein corresponding to a predetermined code; and
  actuator means for differentially moving selected ones of said tubes so as to align them relative to said light cells, enabling light from said source to pass through said light-transmiting areas to energize selected ones of said light cells in accordance with said code.

9. A device for ionverting data from one form to another, comprising:
  frame means;
  a plurality of tubes rotatably mounted in concentric relation with one another on said frame means;
  a source of fluid pressure mounted within the innermost one of said tubes;
  a plurality of fluid-responsive members, responsive to said source of fluid pressure, and mounted around the periphery of the outermost one of said tubes in fixed relation to said frame means;
  each said tube having an array of holes therein corresponding to a predetermined code and adapted to permit the passage of said fluid therethrough;
  said tubes having a home position and a read position with reference to said frame means; and
  actuator means for rotating selected ones of said tubes away from said home position to said read position so as to align selected ones of said holes, thereby enabling fluid from said source to pass therethrough to energize selected ones of said responsive members according to said predetermined code.

References Cited

UNITED STATES PATENTS 3,114,144  12/1963  Woo _____ 340—347
3,220,646  11/1965  Walsh _____ 235—117 X
3,331,067  7/1967   O'Brien _____ 340—365 X MAYNARD R. WILBUR, Primary Examiner C. D. MILLER, Assistant Examiner U.S. Cl. X.R.

340—365